April 14, 1931.  C. I. HOOPLE  1,800,797
FRICTION BALL JOINT
Filed April 1, 1929
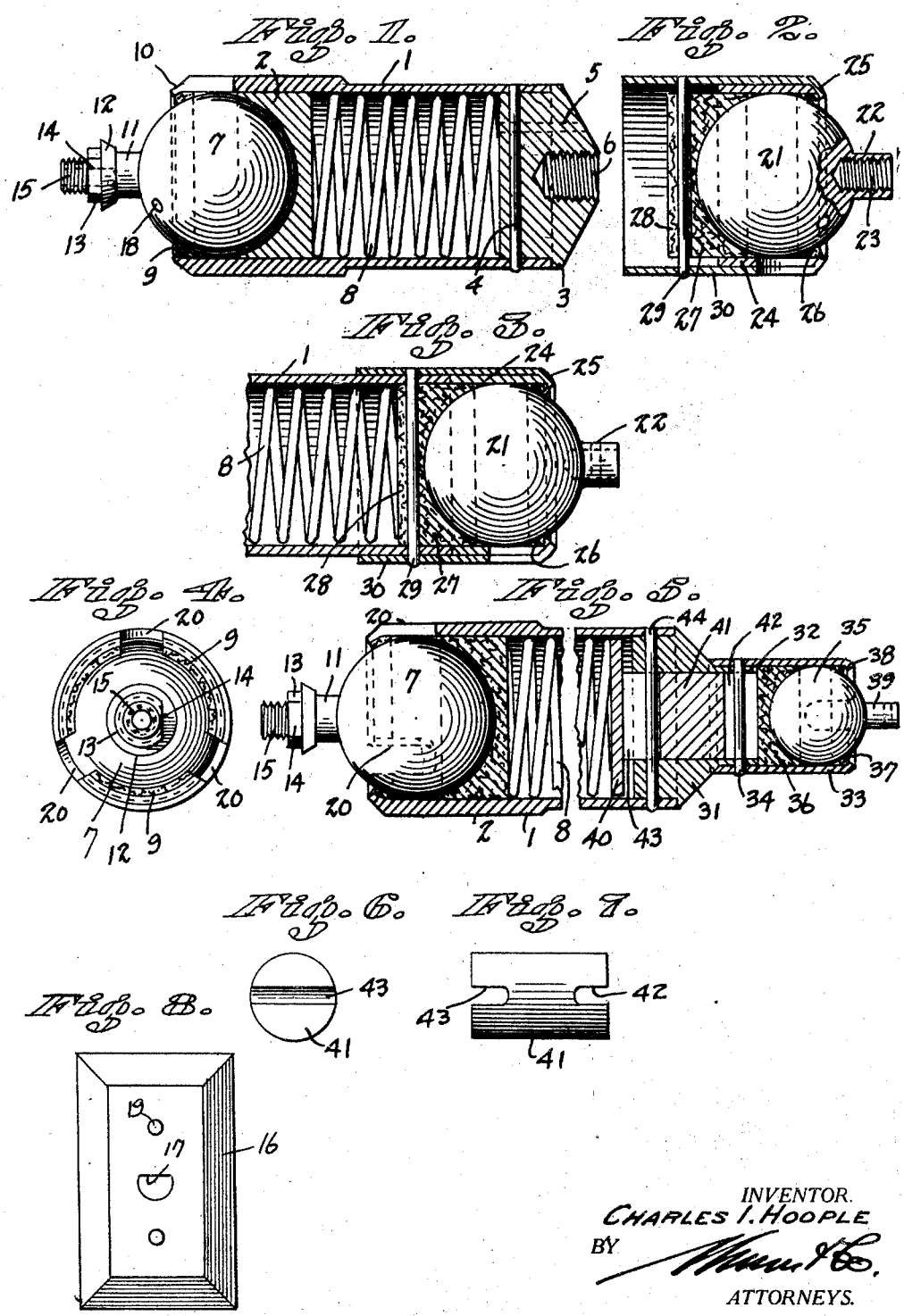
INVENTOR.
CHARLES I. HOOPLE
BY
ATTORNEYS.

Patented Apr. 14, 1931

1,800,797

UNITED STATES PATENT OFFICE

CHARLES I. HOOPLE, OF HONOLULU, TERRITORY OF HAWAII

FRICTION BALL JOINT

Application filed April 1, 1929. Serial No. 351,736.

My invention relates to improvements in friction ball joints, and it consists in the combinations, constructions and arrangements hereinafter described and claimed.

I am well aware of ball joints that are freely movable and depend upon lubrication to aid in the free movement. I am not aware, however, of a friction ball joint that has an operating arc up to a full right angle, the joint being held in adjusted position and being designed to operate without lubrication.

My device is extremely simple in construction, and may be used for various purposes in which one object must be moved with respect to another and be held in its new position without further adjustment being necessary. My device is not designed for a continuous or constant movement, but is intended to be used in appliances in which infrequent but thoroughly flexible changes of position may be made, and in which all of the parts will remain in any desired position because of friction between the parts.

Other objects and advantages will appear as the specification proceeds, and the novel features will be particularly pointed out in the appended claims.

My invention is illustrated in the accompanying drawing, in which

Figure 1 is a longitudinal section through one form of my device;

Figure 2 shows a section through a modified form of the device;

Figure 3 shows a grouping of the forms shown in Figures 1 and 2;

Figure 4 is an end elevation of Figure 1;

Figure 5 is a section through another modified form of the device;

Figures 6 and 7 are end and side views of a part used in the device shown in Figure 5; and Figure 8 is a plan view of a supporting base.

In carrying out my invention I provide a casing 1 that is preferably circular in cross section. At one end I dispose a fiber socket seat 2. At the opposite end I dispose a plug 3. The plug is held in place by a pin 4 and is provided with a drain opening 5 and a threaded recess 6.

The seat 2 is yieldingly held against a ball 7 by means of a spring 8. The spring is disposed between the seat and the plug 3.

The ball is held in place within the casing by a fiber washer 9, and this in turn is prevented from moving outwardly by the crimped end 10 of the casing 1. The ball 7 is held in adjusted position by the fiber washer 9, and the fiber socket seat 2. The force exerted by the spring 8 is sufficient to hold the ball in adjusted position, but at the same time the ball may be moved into a new position.

The ball 7 has a stem 11, and the latter has a shoulder 12 with a projection 13 thereon. This projection has a flattened face 14 as shown in Figure 4, and an internally and externally threaded shank 15 extends from the projection. In Figure 8, I show a support 16 that has an opening 17 for receiving the projection 13. The flat portions of the opening and projection coincide so as to prevent rotation of the member 16 on the stem 11. A nut (not shown) may be threaded upon the portion 15 for securing the support 16 in place. If it is desired to rotate the portion 15 into a threaded recess, a pin (not shown) may be inserted in an opening 18 in the ball 7. This pin acts as a handle for permitting the rotation of the ball. Again referring to Figure 8, it will be noted that the support 16 has openings 19 through which bolts may be passed for securing a camera or other device on the support. The threaded bore 6 may also be screwed down upon a threaded shank projecting from a camera tripod or the like. I do not intend to confine the device to supporting a camera in any desired position, but I merely mention such a use to show how a camera may be supported in a fixed position and yet be turned into any desired position.

The casing 1 is provided with a number of longitudinally-extending recesses 20 (see Figures 1 and 4), and the casing wall is made thicker at this place. These are large enough to receive the stem 11, and will permit the stem to be rotated into a full right angle with respect to the axis of the casing 1. As many recesses as desired may be used. When the recesses are employed, the fiber washer 9 is made up of sections as shown in Figure 4.

In Figure 2 I show a modified form of the device. In this form the spring 8 is done away with. The ball 21 has an integral shank 22 that is threaded internally as at 23. The ball 21 has an opening for a pin. Within the casing 30 I dispose a sleeve 24. This sleeve is held in place by a crimped end 25 of the casing, and the sleeve carries a fiber washer 26 and a fiber seat 27. The seat 27 is grooved as at 28 for receiving a pin 29. The seat 27 and the fiber washer 26 grip the ball 21 and hold it in adjusted position.

In Figure 3 I show a combination of the forms of the device shown in Figures 1 and 2. In this form of the device the casing 1 is received within the casing 30, and the spring 8 bears against the fiber seat 27. The purpose of this construction is to cause the same spring 8 to force the seats 2 and 27 against their respective balls 7 and 21 for holding the latter in adjusted position. At the same time, the spring 8 takes up any wear.

In Figure 5 I show the construction used when balls of different sizes are employed. The ball 7 in this figure and the parts associated therewith are the same as the ball 7 in Figure 1, and therefore like reference numerals will denote corresponding parts. At the opposite end of the casing 1, I mount a plug 31 that takes the place of the plug 3. This plug has a reduced portion 32 upon which is secured a small casing 33 by means of a pin 34.

A small ball 35 is mounted in the casing 33 and is held in place by a seat 36 and a washer 37. The end of the casing 33 is crimped as at 38 for holding the washer 37 in place. The ball 35 carries a shank 39 to which objects may be attached.

The spring 8 in this form of the device causes the seats 2 and 36 to frictionally engage with the balls 7 and 35. It will be noted that the spring bears against the seat 2 and also against a friction disc 40. The latter bears against a movable member 41 that is slidably mounted in the plug 31. The member 41 bears against the seat 36 and has a slot 42 for slidably receiving the pin 34 and a slot 43 for slidably receiving a pin 44 that is used for connecting the plug 31 to the casing 1. The member 41 is shown in Figures 6 and 7. The spring 8 keeps both of the balls 7 and 35 in adjusted position.

The casing 1 may support a section of my anti-glare shield, shown in my co-pending application Serial No. 277,631 filed May 14, 1928.

Although I have shown and described several embodiments of my invention, it is to be understood that the same is susceptible of various changes, and I reserve the right to employ such changes as may come within the scope of the invention as claimed.

I claim:
1. A friction ball joint comprising a casing having a crimped end, a seat disposed at one end of said casing, a fiber ring held in position by the crimped end of the casing, a ball received between the seat and the fiber ring and carrying a shank for supporting an object, a small seat disposed at the other end of said casing, a small ball carried thereby, a plunger bearing against the second seat, and a spring for bearing against the first seat and the plunger.

2. A casing having a reduced portion, a spring mounted in the larger part of the casing, a slide mounted in the reduced portion and being yieldingly urged in one direction by the spring, a ball seat bearing against said slide, a ball disposed in the seat, said casing having a crimped portion for preventing the removal of the ball.

3. A casing having the larger end of a conical-shaped member disposed therein, a second casing secured to the smaller end of the member, said member having a bore, a slide mounted therein, a ball seat slidably mounted in the second casing and bearing against said slide, a ball mounted in the seat, the second casing having a crimped end for retaining the ball, and a spring bearing against the slide for causing the seat to hold the ball in adjusted position.

CHARLES I. HOOPLE.